US009659368B2

(12) United States Patent
Alsop et al.

(10) Patent No.: US 9,659,368 B2
(45) Date of Patent: May 23, 2017

(54) SYSTEM AND METHOD FOR ENHANCING FUNCTIONAL MEDICAL IMAGES

(71) Applicant: Beth Israel Deaconess Medical Center, Boston, MA (US)

(72) Inventors: David Alsop, Newton, MA (US); Li Zhao, Cambridge, MA (US)

(73) Assignee: Beth Israel Deaconess Medical Center, Inc., Boston, MA (US)

( * ) Notice: Subject to any disclaimer, the term of this patent is extended or adjusted under 35 U.S.C. 154(b) by 67 days.

(21) Appl. No.: 14/714,015

(22) Filed: May 15, 2015

(65) Prior Publication Data

US 2016/0335762 A1 Nov. 17, 2016

(51) Int. Cl.
*G06K 9/00* (2006.01)
*G06T 7/00* (2017.01)
*G06T 5/50* (2006.01)

(52) U.S. Cl.
CPC .............. *G06T 7/0012* (2013.01); *G06T 5/50* (2013.01); *G06T 2207/10088* (2013.01);
(Continued)

(58) Field of Classification Search
CPC ... A61B 6/5235; A61B 6/5247; G06T 11/003; G06T 2200/04; G06T 2207/10104; G06T 2207/10012; G06T 2211/40; G06T 7/0012; G06T 7/0097; G09G 2340/10; G09G 2380/08; G06K 9/00617
See application file for complete search history.

(56) References Cited

U.S. PATENT DOCUMENTS

2007/0047840 A1* 3/2007 Xu ................. G06K 9/3216
382/294
2007/0280556 A1* 12/2007 Mullick ............. G06T 5/50
382/294
(Continued)

FOREIGN PATENT DOCUMENTS

EP 1959396 A1 8/2008
EP 2063392 A1 5/2009

OTHER PUBLICATIONS

Alsop, et al., Recommended Implementation of Arterial Spin-Labeled Perfusion MRI for Clinical Applications: A Consensus of the ISMRM Perfusion Study Group and the European Consortium for ASL in Dementia, Magnetic Resonance in Medicine, 2015, 73:102-116.
(Continued)

*Primary Examiner* — Amara Abdi
(74) *Attorney, Agent, or Firm* — Quarles & Brady LLP (57) ABSTRACT

Systems and methods for generating a medical image of a subject that includes functional information. First, two medical images are acquired. One is weighted based on functional information reflecting physiological functions of the subject and the other weighted based on anatomic information of the subject. A difference image between the two images are generated. By subjecting the difference image and the second image to a localized kernel, a local similarity image is generated. Using the local similarity image, an improved difference image is generated. Lastly, by subtracting the improved difference image from the first image, an enhanced medical image that retains the functional information reflecting physiological functions of the subject is generated.

23 Claims, 5 Drawing Sheets

(52) U.S. Cl.
CPC ............... *G06T 2207/10104* (2013.01); *G06T 2207/10108* (2013.01); *G06T 2207/20221* (2013.01); *G06T 2207/30016* (2013.01); *G06T 2207/30104* (2013.01)

(56) References Cited

U.S. PATENT DOCUMENTS

| | | | |
|---|---|---|---|
| 2008/0219535 A1* | 9/2008 | Mistretta | G06T 11/006 382/131 |
| 2009/0136102 A1* | 5/2009 | Kimpe | G06T 5/50 382/128 |
| 2014/0225926 A1* | 8/2014 | Mathers | G09G 5/14 345/634 |

OTHER PUBLICATIONS

Pajares, et al., A Wavelet-Based Image Fusion Tutorial, Pattern Recognition, 2004, 37:1855-1872.

Quarantelli, et al., Frequency Encoding for Simultaneous Display of Multimodality Images, Journal of Nuclear Medicine, 1999, 40(3):442-447.

PCT International Search Report and Written Opinion, PCT/US2016/029976, Aug. 4, 2016.

* cited by examiner

SYSTEM AND METHOD FOR ENHANCING FUNCTIONAL MEDICAL IMAGES

STATEMENT REGARDING FEDERALLY-SPONSORED RESEARCH

This invention was made with government support under 2 R01 MH080729-04A1 awarded by the National Institutes of Health. The government has certain rights in the invention.

CROSS REFERENCE

N/A

BACKGROUND

Frequently in medical imaging, a functional image with the contrast of interest has a signal-to-noise ratio (SNR) or spatial resolution lower than ideal. For example, arterial spin labeling (ASL) is a technique in magnetic resonance imaging (MRI) that can be used to provide functional information using MRI, despite the fact that MRI excels at anatomic imaging and does not inherently include functional information in anatomic images. Unfortunately, using ASL, like many other techniques to acquire functional information using MRI, yields a noisy, lower resolution image than may be achieved with images that are intended to be purely anatomic, such as T1-weighted or T2-weighted anatomic images.

As a result, many have sought to improve the quality of functional images acquired using MRI, such as by increasing SNR or compensating for low resolutions. One way to improve the quality of a functional image is to combine the functional image with the anatomic image. In these methods, the acquired functional images are combined with anatomic images in an effort to improve SNR or resolution. These fusion methods are designed to fuse the information in both the anatomic and functional images to maximize the information in the resulting fusion image. The resulting image would include extra structures that may help localize a lesion. But, importantly, this also results in a fusion image of a different contrast. So these "fusion" methods generally produce a combined image with information not readily attributable to either the functional image or the anatomic image, or provide a confusing attempt to overlay both sets of information. As such, the functional information can be obscured or, worse, misleading. Thus, such "fusion" or enhancement methods are often shunned in the clinical environment because clinicians cannot allow the functional data to be obscured or rendered inaccurate.

It would be desirable to have a system and method for enhancing a functional images without interfering or degrading the functional information.

SUMMARY

The present disclosure overcomes the aforementioned drawbacks by providing systems and methods for enhancing functional medical images. To preserve the contrast from the functional image and also include the anatomic information from the anatomic image, an improved difference image is subtracted from the functional image to partially remove local similarity.

In accordance with one aspect of the disclosure, a method for generating a medical image of a subject including functional information is provided. First, two medical images are acquired. One is weighted based on functional information reflecting physiological functions of the subject and the other is weighted based on anatomic information of the subject. A difference image between the two images is generated. By subjecting the difference image and the second image to a localized kernel, a local similarity image is generated. Using the local similarity image, an improved difference image is generated. Lastly, by subtracting the improved difference image from the first medical image, an enhanced medical image that retains the functional information is generated.

In accordance with another aspect of the disclosure, a magnetic resonance imaging (MRI) system is disclosed that includes a magnet system configured to generate a polarizing magnetic field about at least a portion of a subject arranged in the MRI system and a magnetic gradient system including a plurality of magnetic gradient coils configured to apply at least one magnetic gradient field to the polarizing magnetic field. The MRI system also includes a radio frequency (RF) system configured to apply an RF field to the subject and to receive magnetic resonance (MR) signals therefrom and a computer system. The computer system is programmed to first acquire two MRI images. One image is weighted based on functional information reflecting physiological functions of the subject, and the other is weighted based on anatomic information of the subject. The computer system is also programmed to generate a difference image between the two images, then generate a local similarity image by subjecting the difference image and the second image to a localized kernel. The computer system is further programmed to generate an improved difference image using the local similarity image. Lastly, the computer system is programmed to generate an enhanced medical image by subtracting the improved difference image from the first medical image. The enhanced image retains the functional information.

The foregoing and other aspects and advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

The systems and methods disclosed herein can be used to enhance a functional medical image with localized anatomic information. The medical images can be acquired with a magnetic resonance imaging (MRI) system, such as the below-described system 100.

Figure 1:
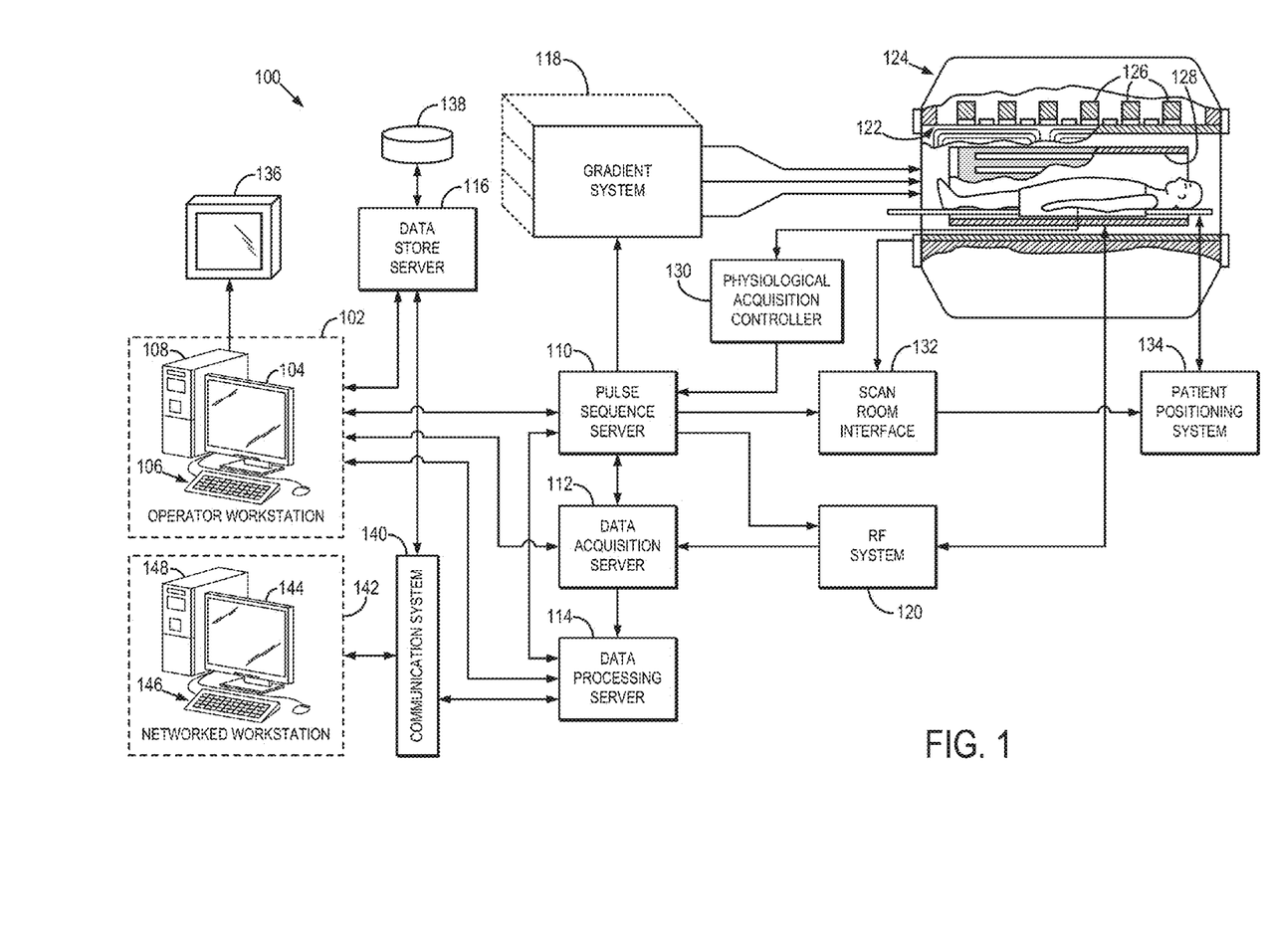
FIG. 1 is a block diagram of an example of a magnetic resonance imaging (MRI) system configured to employ the present disclosure.

Referring particularly to FIG. 1, an example of an MRI system 100 is illustrated. The MRI system 100 includes a workstation 102 having a display 104 and a keyboard 106. The workstation 102 includes a processor 108 that is commercially available to run a commercially-available operating system. The workstation 102 provides the operator interface that enables scan prescriptions to be entered into the MRI system 100. The workstation 102 is coupled to four servers: a pulse sequence server 110; a data acquisition server 112; a data processing server 114; and a data store server 116. The workstation 102 and each server 110, 112, 114, and 116 are connected to communicate with each other.

The pulse sequence server 110 functions in response to instructions downloaded from the workstation 102 to operate a gradient system 118 and a radiofrequency (RF) system 120. Gradient waveforms necessary to perform the prescribed scan are produced and applied to the gradient system 118, which excites gradient coils in an assembly 122 to produce the magnetic field gradients $G_x$, $G_y$, and $G_z$ used for position encoding MR signals. The gradient coil assembly 122 forms part of a magnet assembly 124 that includes a polarizing magnet 126 and a whole-body RF coil 128 (or a head (and neck) RF coil for brain imaging).

RF excitation waveforms are applied to the RF coil 128, or a separate local coil, such as a head coil, by the RF system 120 to perform the prescribed magnetic resonance pulse sequence. Responsive MR signals detected by the RF coil 128, or a separate local coil, are received by the RF system 120, amplified, demodulated, filtered, and digitized under direction of commands produced by the pulse sequence server 110. The RF system 120 includes an RF transmitter for producing a wide variety of RF pulses used in MR pulse sequences. The RF transmitter is responsive to the scan prescription and direction from the pulse sequence server 110 to produce RF pulses of the desired frequency, phase, and pulse amplitude waveform. The generated RF pulses may be applied to the whole body RF coil 128 or to one or more local coils or coil arrays.

The RF system 120 also includes one or more RF receiver channels. Each RF receiver channel includes an RF preamplifier that amplifies the MR signal received by the coil 128 to which it is connected, and a detector that detects and digitizes the quadrature components of the received MR signal. The magnitude of the received MR signal may thus be determined at any sampled point by the square root of the sum of the squares of the I and Q components:

$$M = \sqrt{I^2 + Q^2} \qquad (1),$$

and the phase of the received MR signal may also be determined:

$$\varphi = \tan^{-1}\left(\frac{Q}{I}\right). \qquad (2)$$

The pulse sequence server 110 also optionally receives patient data from a physiological acquisition controller 130. The controller 130 receives signals from a number of different sensors connected to the patient, such as electrocardiograph (ECG) signals from electrodes, or respiratory signals from a bellows or other respiratory monitoring device. Such signals are typically used by the pulse sequence server 110 to synchronize, or "gate," the performance of the scan with the subject's heart beat or respiration.

The pulse sequence server 110 also connects to a scan room interface circuit 132 that receives signals from various sensors associated with the condition of the patient and the magnet system. It is also through the scan room interface circuit 132 that a patient positioning system 134 receives commands to move the patient to desired positions during the scan.

The digitized MR signal samples produced by the RF system 120 are received by the data acquisition server 112. The data acquisition server 112 operates in response to instructions downloaded from the workstation 102 to receive the real-time MR data and provide buffer storage, such that no data is lost by data overrun. In some scans, the data acquisition server 112 does little more than pass the acquired MR data to the data processor server 114. However, in scans that require information derived from acquired MR data to control the further performance of the scan, the data acquisition server 112 is programmed to produce such information and convey it to the pulse sequence server 110. For example, during prescans, MR data is acquired and used to calibrate the pulse sequence performed by the pulse sequence server 110. Also, navigator signals may be acquired during a scan and used to adjust the operating parameters of the RF system 120 or the gradient system 118, or to control the view order in which k-space is sampled. In all these examples, the data acquisition server 112 acquires MR data and processes it in real-time to produce information that is used to control the scan.

The data processing server 114 receives MR data from the data acquisition server 112 and processes it in accordance with instructions downloaded from the workstation 102. Such processing may include, for example: Fourier transformation of raw k-space MR data to produce two or three-dimensional images; the application of filters to a reconstructed image; the performance of a backprojection image reconstruction of acquired MR data; the generation of functional MR images; and the calculation of motion or flow images.

Images reconstructed by the data processing server 114 are conveyed back to the workstation 102 where they are stored. Real-time images are stored in a data base memory cache (not shown), from which they may be output to operator display 104 or a display 136 that is located near the magnet assembly 124 for use by attending physicians. Batch mode images or selected real time images are stored in a host database on disc storage 138. When such images have been reconstructed and transferred to storage, the data processing server 114 notifies the data store server 116 on the workstation 102. The workstation 102 may be used by an operator to archive the images, produce films, or send the images via a network or communication system 140 to other facilities that may include other networked workstations 142.

The communication system 140 and networked workstation 142 may represent any of the variety of local and remote computer systems that may be included within a given clinical or research facility including the system 100 or other, remote location that can communicate with the system 100. In this regard, the networked workstation 142 may be functionally and capably similar or equivalent to the operator workstation 102, despite being located remotely and communicating over the communication system 140. As such, the networked workstation 142 may have a display 144 and a keyboard 146. The networked workstation 142 includes a processor 148 that is commercially available to run a commercially-available operating system. The networked workstation 142 may be able to provide the operator interface that enables scan prescriptions to be entered into the MRI system 100.

Figure 2:
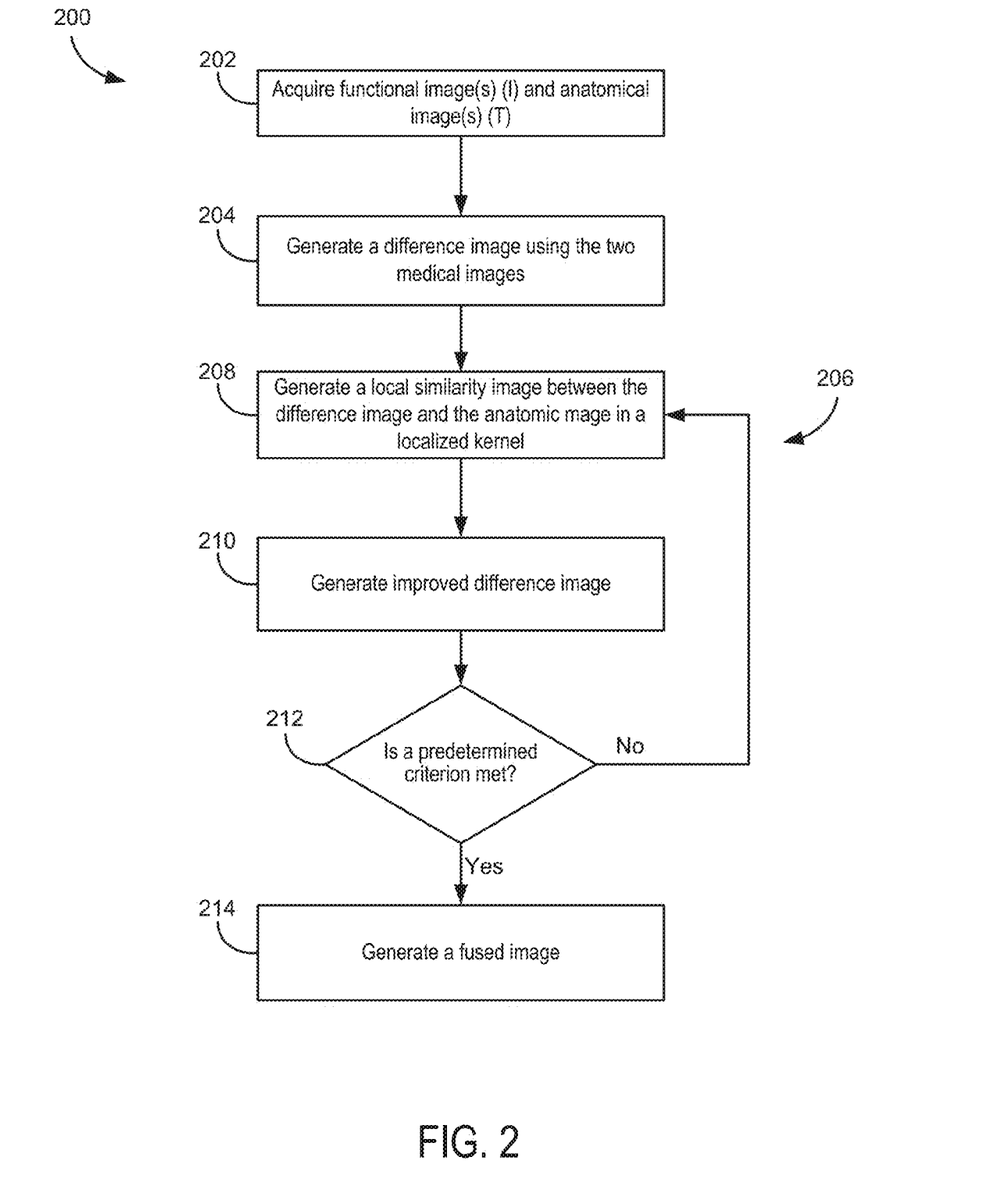
FIG. 2 is a flow chart setting forth the steps of one non-limiting example of a method for generating an enhanced medical image implemented according to the present application.

Referring to FIG. 2, a flowchart 200 of an example method implemented according to the present application is provided. In step 202, two medical images are acquired. One depicts physiological functions of a subject while the other depicts anatomy of the subject. An example of a functional image can be a perfusion image acquired with arterial spin labeling pulse sequence or a P+ image, and an example of anatomic image can be a T1-weighted image, or a T2-weighted image, or a fluid-attenuated image acquired with a fluid-attenuated inversion recovery (FLAIR) pulse sequence of the same location in the subject. The images can be acquired with different medical modalities. For example, the functional image can be acquired by a positron emission tomography (PET) or a single-photon emission computed tomography (SPECT), while the anatomic image can be acquired by MRI.

The two images can be denoted as I and T, with I for the functional image and T for the anatomic image. The anatomic image may have better image quality, resolution, SNR, contrast, or other such desirable attributes than the functional image. The functional image can be viewed as comprising two images: one as similar as possible to the anatomic image, and the other as dissimilar as possible to the anatomic image. A metric of similarity and dissimilarity can be the mutual information in information theory.

Still referring to FIG. 2, in step 204, a difference image between the two images may be generated. When generating the difference image, it may be desirable to threshold or otherwise restrict the image to a space of interest. For example, both images is normalized as:

$$S^n = \frac{\langle KD_{imp}^{n-1}, KT_{nml} \rangle}{\langle KT_{nml}, KT_{nml} \rangle} KT_{nml}, \tag{6}$$

where $I_{nml}$ and $T_{nml}$ are the normalized functional and anatomic images, respectively; and $\langle \cdot \rangle$ denotes expectation (i.e., average across image voxels).

A similarity image S between I and T can be calculated as:

$$S = \frac{\langle I_{nml}, T_{nml} \rangle}{\langle T_{nml}, T_{nml} \rangle} T_{nml}. \tag{5}$$

Then the difference image D between I and T is:

$$D = I_{nml} - S \tag{6}$$

As a result, two images are created: D—an orthogonal image to T as the expectation of DT is zero, and S—an image that is as similar as possible to the anatomic image T.

As indicated generally at 206, an improved difference image may be created. The similarity can be improved to be a more subtle and regionally specific, for example by iteratively removing similarities from D on a regional basis.

This process can be part of an iterative process. Consider a localized kernel, K, with unit normalization. In particular, at step 208, a local similarity can be calculated using the localized kernel K, such as:

$$S^n = \frac{\langle KD_{imp}^{n-1}, KT_{nml} \rangle}{\langle KT_{nml}, KT_{nml} \rangle} KT_{nml}, \tag{6}$$

where n=1, 2, . . . denotes the nth iteration, $S^n$ denotes the local similarity calculated at the nth iteration, and $D_{imp}^{n-1}$ denotes the improved difference image calculated in the prior iteration. The initial improved difference image $D_{imp}$ can be the difference image calculated according to Eqs. (5) and (6), i.e., $D_{imp}^0 = D$. In one configuration, the initial improved difference image $D_{imp}$ can be $I_{nml}$—i.e., $D_{imp}^0 = I_{nml}$. The convergence of the iterative process may be slower with this initialization than that initialized with a difference image.

The local similarity can be further improved by removing components that are not orthogonal to the anatomic image T. With the local similarity calculated, at step 210, the difference image can be improved by removing the local similarity $S^n$ as:

$$D_{imp}^n = D_{imp}^{n-1} - \epsilon S^n \tag{7},$$

where $\epsilon$ is a relaxation factor. The relaxation factor can be a positive number and kept significantly less than one so that the process can slowly and uniformly progress to an image that is as different as possible from the anatomic image. The kernel K can be moved around in the image either systematically or randomly, and also be expanded or contracted while moving around. The kernel can be a box or cubic kernel, a smooth function, or a wavelet. An example smooth function can be a Gaussian kernel that can be used to reduce ringing artifacts. A Gaussian kernel can be expressed as:

$$K = \exp\left(-\frac{(r-r_0)^2}{2\sigma^2}\right) \tag{7}$$

The position of a Gaussian kernel depends on $r_0$ and the kernel size depends on $\sigma$. The kernels can be normalized as:

$$K = \frac{K}{\sum K} \tag{7}$$

At decision block 212, the iterative process can stop when a predetermined criterion is met. For example, the predetermined criterion may include a maximum iteration number (e.g., when n reaches 200). Alternatively, the predetermined criterion may relate to the qualitative improvement. Even when tied to a qualitative measure, a quantitative change threshold may be used. The predetermined criterion may be the root mean square (rms) across the image having a change between $D_{imp}^{n-1}$ and $D_{imp}^n$ of less than a particular value. For example, the change may be less than 0.1% of the rms of the prior estimate $D_{imp}^{n-1}$.

Also, more than one anatomic image can be used in the systems and methods as disclosed herein. The multiple anatomic images can have different contrasts. The local similarity in Eq. (6) can be searched with each anatomic image $T_{nml,i}$ as:

$$S_i^n = \frac{\langle KD_{imp,i}^{n-1}, KT_{nml,i}\rangle}{\langle KT_{nml,i}, KT_{nml,i}\rangle} KT_{nml,i}, \quad (7)$$

and the difference image can be improved with each anatomic image as:

$$D_{imp,j}^n = D_{imp,j}^{n-1} - \epsilon S_i^n \quad (7).$$

When two or more different contrast anatomic images are used, the fusion image can be generated by using an anatomic image of one contrast first and switching to an anatomic image of a different contrast when the iteration improvement is less than a certain threshold, such as 1%. The contrast of the fused image is dominated by that of the starting anatomic image although there is a small change in the fused image after switching to a different anatomic image.

Moving the kernel around during the iteration process can be computationally intense. Alternatively, the kernel calculation can be performed simultaneously across all kernel positions using the Fourier transform convolution theorem. For example, the localized similarity can be calculated as:

$$S^n = \left(\left(\frac{\langle K*D_{imp}^{n-1}T_{nml}\rangle}{\langle KK*D_{imp}^{n-1}T_{nml}\rangle}\right)*K\right)T_{nml}. \quad (8)$$

A kernel having about twice the width of the point spread function of the functional image can be used. A regularization term can be added in the denominator of the above Eq. (8) to prevent the calculation from blowing up near the edges of the image where the signals are zero or close to zero.

In one configuration, a functional image can be enhanced by combining the functional image and the anatomic image as a normalized multiplication. For example:

$$I_{imp} = \left(\frac{K*I}{K*T}\right)T. \quad (9)$$

This produces similar results to the iterative process described above when a small kernel is used.

Once the iterative process is stopped, at step 214, a fused image that preserves the functional information of the functional image but enhances the overall image quality with information from the anatomic images, can be generated as:

$$I_{imp} = I_{nml} - D_{imp,final} \quad (10).$$

Figure 3:
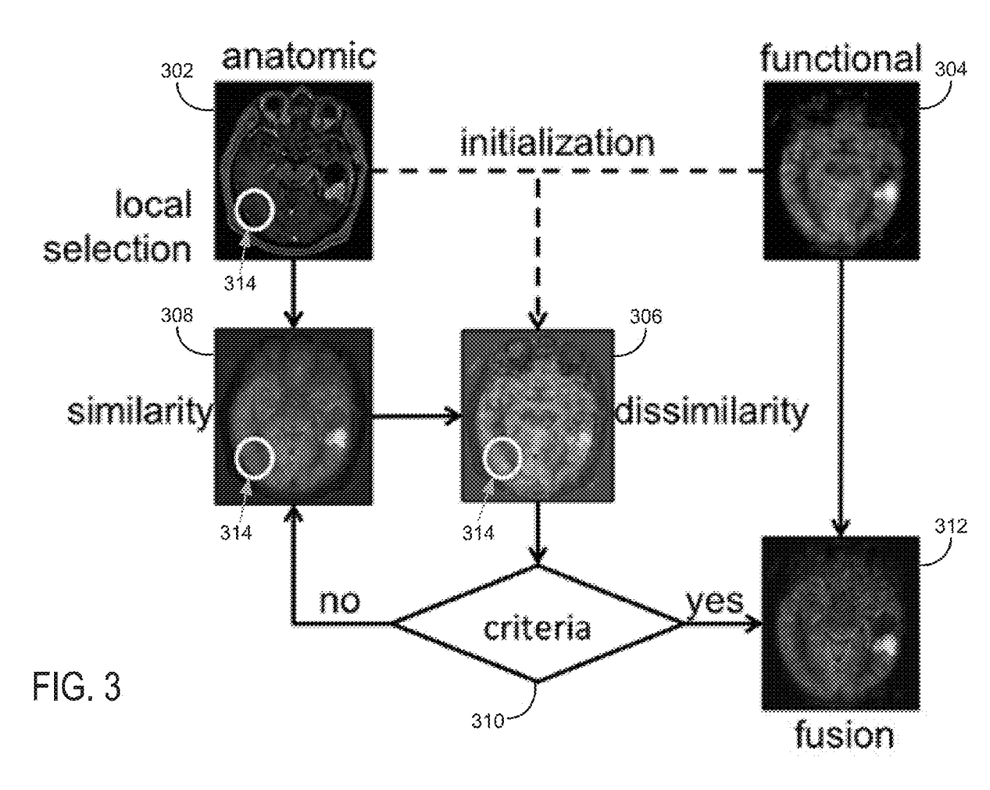
FIG. 3 is a flow chart setting forth an example method for generating an enhanced brain image implemented according to the present application.

Referring now to FIG. 3, a flowchart of an example implementation of the systems and methods as disclosed herein to enhance an ASL image is provided. First, an anatomic image 302 and a functional image 304, such as an ASL image, are acquired. The ASL image 304 depicts perfusion of a subject's brain. Its SNR and resolution are poor compared to the anatomic image 302 such that its diagnostic value is limited. Next, a global dissimilarity image 306 is generated and used to initialize an iterative process to improve the dissimilarity image 306 by incorporating a local similarity image 308. The local similarity image 308 is generated using a localized kernel 314. The local similarity in relation with the localized kernel 314 is preserved and included into the improved dissimilarity image 306 (see the localized kernel 314 in the anatomic image 302, the localized similarity image 308, and the dissimilarity image 306). The dissimilarity image 308 may be used to update the localized similarity image 308 if the criterion 310 is not met. This iterative process is repeated until the criterion 310 is met. Once the criterion is met, a fusion image 312 is generated using the ASL image 304 and the final dissimilarity image 306. The fusion image 312 preserves the contrast in the original ASL image 304 but with improved image quality and, thus, a better diagnostic value than the original ASL image 304.

Numerical simulation can be used to select parameters, such as the kernel size and the relaxation factor. "Ideal" 3D ASL images can be numerically generated as follows. First, T1-weighted images of high resolution and high SN are acquired. The images can be directly acquired by scanning a subject with a T1-weighted pulse sequence on an MRI system or transferred from a storage unit, such as a computer, database, a hand-held device, or the cloud. These T1-weighted images are used as the anatomic images.

Then, the T1-weighted images may be segmented into gray matter (GM), white matter (WM), cerebrospinal fluid, bone, and soft tissue. To achieve a contrast similar to an ASL MRI scan, the perfusion values of the GM and WM may be assigned with values similar to their clinical values. For example, GM of the segmented images may be given perfusion value of 70 ml/100 g/min, and a value of 20 ml/100 g/min is assigned to WM. All regions other than GM and WM are removed to construct a numerical phantom. The phantom is further smoothed by a Gaussian convolution kernel (e.g., size 3×3×3 pixels and standard deviation 0.65 pixels) to avoid unrealistic transition. As such, the images of the phantom have a perfusion contrast but with high resolution. They are referred to as ideal ASL images.

To simulate the image quality of an ASL scan, the ideal ASL images are transformed into k-space, filtered with a low-pass-filter, and added with complex white Gaussian noise. This results in a low quality ASL image, e.g. with low SNR.

Figure 4A:
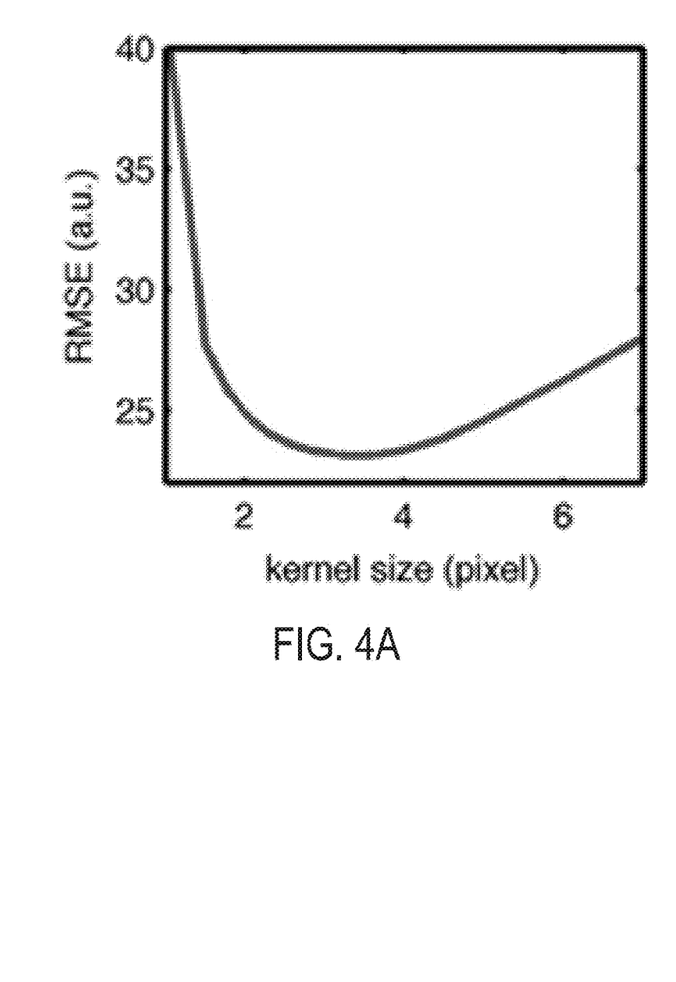
FIG. 4A shows the error of the fusion image in relation with kernel sizes.
Figure 4B:
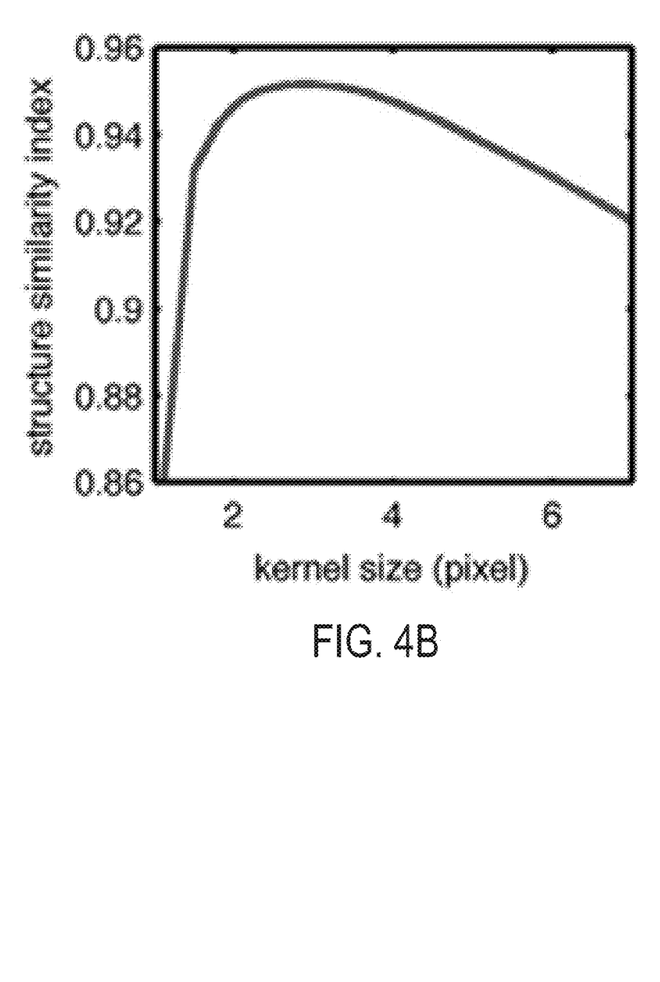
FIG. 4B shows structure similarity of the fusion image with a simulated ideal functional image in relation with kernel sizes.

To optimize kernel sizes, the fusion image can be calculated with varying kernel sizes o of a Gaussian kernel from 1 to 7 pixels. Referring to FIGS. 4A and 4B, the performance of the method as disclosed herein with different kernel sizes is provided. The minimum root mean square error (RMSE) compared with the ideal ASL images is achieved with kernel of 3.4 pixels (FIG. 4A) and maximum structural similarity (SSIM) is achieved with kernel of 3 pixels (FIG. 4B).

A fused image acquired with the systems and methods as disclosed herein can maintain the contrast of the initial ASL image and, at the same time, includes high resolution anatomic information from the anatomic image. Thus, a better approximation of the ideal ASL image is generated. Fused images generated with small kernel sizes detect detail structures and follow the contrast of the initial ASL image better than those with large kernel sizes. But, on the other hand, they have limited performance on noise suppression and more Gibbs ringing artifacts.

In the systems and methods as disclosed herein, the relaxation factor $\epsilon$ controls the speed of convergence of the iterative process. To optimize the relaxation factor, the performance of the systems and methods can be evaluated with relaxation factors from 0.1 to 0.5.

Figure 5A:
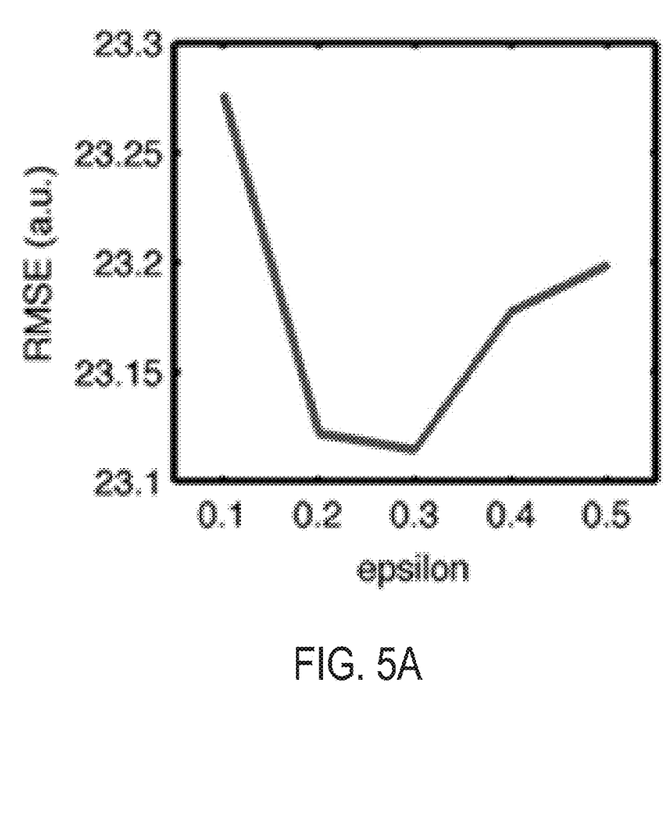
FIG. 5A shows the error of the fusion image in relation with the relaxation factor.
Figure 5B:
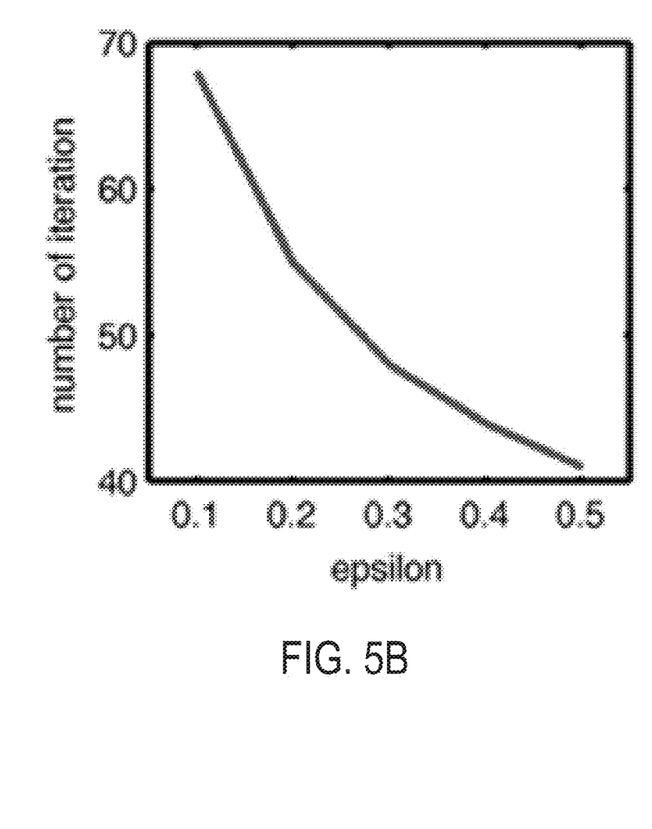
FIG. 5B shows the speed of convergence of the systems and methods as disclosed herein in relation with the relaxation factor.

Referring to FIGS. 5A and 5B, the performance of the systems and methods as disclosed herein with different relaxation factor $\epsilon$ is provided. Using an intermediate relaxation factor (around 0.2-0.3) slightly improves the image quality (see the decreased errors for intermediate relaxation factors shown in FIG. 5A), and using a small relaxation factor increases computational time significantly (FIG. 5B).

The systems and methods as disclosed herein can be used to preserve the contrast and information in the functional image and, at the same time, improve the quality of the functional image with detailed structural information from the anatomic image for diagnostic purposes. Compared to other fusion methods, the error (RMSE) of the fusion image generated with the systems and methods as disclosed herein is reduced and structural similarity (SSIM) is improved. The systems and methods as disclosed herein can also be used to suppress noise and increase contrast-to-noise (CNR) ratio, as shown in the table below. Moreover, the systems and methods as disclosed herein are less computationally complex than, for example, a wavelet method because the wavelet method requires tradeoff coefficients between functional and anatomic images.

| CNR | Lesion1 | Lesion2 |
|---|---|---|
| Original image | 28.4 | 62.7 |
| Enhanced with a wavelet method | 20.8 | 53.7 |
| Enhanced with the systems and methods as disclosed herein | 43.5 | 97.7 |

If the contrast in the anatomic image is close to that of the functional image, the quality of the image produced with the systems and methods disclosed herein can be further enhanced. To be in such desired contrast, the anatomic image can be preprocessed with a priori information. For example, with some a priori information, a T1-weighted image can be processed with a Gaussian transformation so that gray matter is the brightest in the image.

If the subject moves during the medical image acquisition or a different medical modality is used to acquire the functional image from that for the anatomic image, the anatomic and functional images may not depict the same location in the subjection. The two images can be spatially registered before the systems and methods are applied to fuse them. A person skilled in the art would appreciate that any available image registration methods can be used to register the two images.

The systems and methods as disclosed herein can be applied to images without fine-tuning parameters. For example, as shown above, the systems and methods can be applied without choosing parameters except the kernel size.

The systems and methods as disclosed herein can be used to preserve the low frequency information in the functional image. The systems and methods can use multiplicative combinations (e.g., as shown in Eqs. (8) or (9)), instead of a prior method using addition of components, and provide better results than the prior method.

The systems and methods can be integrated with an imaging system or a viewer, or implemented as a separate module where data can be acquired from another system, such as an imaging system, a database, a network, a computer, a hand-held device, or the cloud. It can be tied to a particular application, such as ASL using MRI, or be applied to enhance a functional medical image of different contrast mechanisms or other imaging modalities.

The present invention has been described in terms of one or more preferred embodiments, and it should be appreciated that many equivalents, alternatives, variations, and modifications, aside from those expressly stated, are possible and within the scope of the invention.

As used in the claims, the phrase "at least one of A, B, and C" means at least one of A, at least one of B, and/or at least one of C, or any one of A, B, or C or combination of A, B, or C. A, B, and C are elements of a list, and A, B, and C may be anything contained in the Specification.

The invention claimed is:

1. A method for generating a medical image of a subject including functional information, the steps of the method comprising:
a) acquiring a first medical image weighted based on functional information reflecting physiological functions of the subject and a second medical image weighted based on anatomic information of the subject;
b) generating a difference image between the first medical image and the second medical image;
c) generating a local similarity image by subjecting the difference image and the second medical image to a localized kernel;
d) generating an improved difference image using the local similarity image; and
e) generating an enhanced medical image by subtracting the improved difference image from the first medical image to retain the functional information reflecting physiological functions of the subject.

2. The method as recited in claim 1, wherein step b) includes
normalizing the first and the second medical images to generate a normalized first image and a normalized second image as:

$$I_{nml} = \frac{I - \langle I \rangle}{(\langle I^2 \rangle - \langle I \rangle^2)},$$

and $$T_{nml} = \frac{T - \langle T \rangle}{(\langle T^2 \rangle - \langle T \rangle^2)},$$

where $I_{nml}$ and $T_{nml}$ denote the normalized first and second images respectively, I and T denote the first medical image and the second medical image respectively, and $\langle \cdot \rangle$ denotes expectation; and
generating the similarity image and the difference image as:

$$S = \frac{\langle I_{nml}, T_{nml} \rangle}{\langle T_{nml}, T_{nml} \rangle} T_{nml}$$

and $$D = I_{nml} - S,$$

where D and S denote the difference image and the similarity image, respectively.

3. The method as recited in claim 1, further comprising repeating step d) until a predetermined criterion is met, wherein the predetermined criterion includes one of a maximum of iterations or a change threshold between iterations.

4. The method as recited in claim 3, wherein the local similarity image in step c) is calculated as:

$$S^n = \frac{\langle KD_{imp}^{n-1}, KT_{nml} \rangle}{\langle KT_{nml}, KT_{nml} \rangle} KT_{nml},$$

where $S^n$ denotes the local similarity image, K denotes the localized kernel, $T_{nml}$ is the normalized second image, and $D_{imp}^{n-1}$ is the improved difference image from a prior iteration.

5. The method as recited in claim 3, wherein the local similarity image in step c) is calculated as:

$$S^n = \left(\left(\frac{\langle K * D_{imp}^{n-1} T_{nml}\rangle}{\langle KK * D_{imp}^{n-l} T_{nml}\rangle}\right) * K\right) T_{nml},$$

where $S^n$ denotes the local similarity image, K denotes the localized kernel, * denotes convolution, $T_{nml}$ is the normalized second image, and $D_{imp}^{n-1}$ is the improved difference image from a prior iteration.

6. The method as recited in claim 1, wherein a position of the localized kernel is randomly selected.

7. The method as recited in claim 1, wherein the localized kernel is a box kernel, a cubic kernel, a Gaussian kernel, or a wavelet.

8. The method as recited in claim 1, wherein the first medical image and the second medical image are magnetic resonance images.

9. The method as recited in claim 1, wherein step d) includes generating the improved difference image by subtracting a product of the local similarity image and a user-selected relaxation factor.

10. The method as recited in claim 1, wherein step d) includes generating an image orthogonal to the second image and an image that is as similar as possible to the second image.

11. A magnetic resonance imaging (MRI) system, comprising:
   a magnet system configured to generate a polarizing magnetic field about at least a portion of a subject arranged in the MRI system;
   a magnetic gradient system including a plurality of magnetic gradient coils configured to apply at least one magnetic gradient field to the polarizing magnetic field;
   a radio frequency (RF) system configured to apply an RF field to the subject and to receive magnetic resonance (MR) signals therefrom;
   a computer system programmed to:
      a) acquire a first MRI image weighted based on functional information reflecting physiological functions of the subject; and a second MRI image weighted based on anatomic information of the subject;
      b) generate a difference image between the first MRI image and the second MRI image;
      c) generate a local similarity image by subjecting the difference image and the second MRI image to a localized kernel;
      d) generate an improved difference image using the local similarity image; and
      e) generate an enhanced MRI image by subtracting the improved difference image from the first MRI image to retain the functional information reflecting physiological functions of the subject.

12. The system as recited in claim 11, wherein b) includes: normalize the first and the second MRI images to generate a normalized first image and a normalized second image as:

$$I_{nml} = \frac{I - \langle I\rangle}{(\langle I^2\rangle - \langle I\rangle^2)},$$

and $$T_{nml} = \frac{T - \langle T\rangle}{(\langle T^2\rangle - \langle T\rangle^2)},$$

where $I_{nml}$ and $T_{nml}$ denote the normalized first and second images respectively, I and T denote the first MRI image and the second MRI image respectively, and $\langle \cdot \rangle$ denotes expectation; and generate a similarity image and the difference image as:

$$S = \frac{\langle I_{nml} T_{nml}\rangle}{\langle T_{nml} T_{nml}\rangle} T_{nml},$$

and $$D = I_{nml} - S,$$

where D and S denote the difference image and the similarity image, respectively.

13. The system as recited in claim 11, further comprising repeating d) until a predetermined criterion is met, wherein the predetermined criterion includes one of a maximum of iterations or a change threshold between iterations.

14. The system as recited in claim 13, wherein the local similarity image in c) is calculated as:

$$S^n = \frac{\langle KD_{imp}^{n-1}, KT_{nml}\rangle}{\langle KT_{nml}, KT_{nml}\rangle} KT_{nml},$$

where $S^n$ denotes the local similarity image, K denotes the localized kernel, $T_{nml}$ is the normalized second image, and $D_{imp}^{n-1}$ is the improved difference image from a prior iteration.

15. The system as recited in claim 13, wherein the local similarity image in c) is calculated as:

$$S^n = \left(\left(\frac{\langle K * D_{imp}^{n-1} T_{nml}\rangle}{\langle KK * D_{imp}^{n-l} T_{nml}\rangle}\right) * K\right) T_{nml},$$

where $S^n$ denotes the local similarity image, K denotes the localized kernel, * denotes convolution, $T_{nml}$ is the normalized second image, and $D_{imp}^{n-1}$ is the improved difference image from a prior iteration.

16. The system as recited in claim 11, wherein a position of the localized kernel is randomly selected.

17. The system as recited in claim 11, wherein the localized kernel is a box kernel, or a cubic kernel, a Gaussian kernel, or a wavelet.

18. The system as recited in claim 11, wherein the improved difference image in d) is generated by subtracting a product of the local similarity image and a user-selected relaxation factor.

19. The system as recited in claim 11, wherein step d) includes generating an image orthogonal to the second image and an image that is as similar as possible to the second image.

20. A method for generating a medical image of a subject including functional information, the steps of the method comprising:
   a) acquiring a first medical image weighted based on functional information reflecting physiological functions of the subject and a second medical image weighted based on anatomic information of the subject;

b) generating a fraction as a localized kernel convolved with the first medical image divided by the localized kernel convolved with the second medical image; and c) generating a fused image by multiplying the fraction with the second medical image, wherein the fused image retains the functional information reflecting physiological functions of the subject and the anatomic information.

21. The method as recited in claim 20, further comprising:
generating the fraction as a first localized kernel convolved with the first medical image divided by a second localized kernel convolved with the second medical image, wherein the first localized kernel and the second localized kernel are not identical in size and shape.

22. The method as recited in claim 20, wherein the localized kernel is a box kernel, a cubic kernel, a Gaussian kernel, or a wavelet.

23. The method as recited in claim 20, wherein the functional information shows contrast of arterial spin labeling.

\* \* \* \* \*

UNITED STATES PATENT AND TRADEMARK OFFICE
CERTIFICATE OF CORRECTION

PATENT NO.      : 9,659,368 B2
APPLICATION NO. : 14/714015
DATED           : May 23, 2017
INVENTOR(S)     : David Alsop et al.

It is certified that error appears in the above-identified patent and that said Letters Patent is hereby corrected as shown below:

Column 5, Line 44-46, " $$I_{nml} = \frac{I-\langle I \rangle}{\left(\langle I^2 \rangle - \langle I \rangle^2\right)} \quad (6)$$ " should be $$I_{nml} = \frac{I-\langle I \rangle}{\left(\langle I^2 \rangle - \langle I \rangle^2\right)} \quad (3)$$

-- and $$T_{nml} = \frac{T-\langle T \rangle}{\left(\langle T^2 \rangle - \langle T \rangle^2\right)} \quad (4)$$

--.

Column 6, Line 7, "(6)" should be --(7)--.

Column 6, Line 27, "(7)" should be --(8)--.

Column 6, Line 41, "(7)" should be --(9)--.

Column 6, Line 49, "(7)" should be --(10)--.

Column 6, Line 66, "Eq. (6)" should be --Eq. (7)--.

Column 7, Line 2, "(7)" should be --(11)--.

Column 7, Line 8, "(7)" should be --(12)--.

Column 7, Line 26, "(8)" should be --(13)--.

Column 7, Line 33, "(8)" should be --(13)--.

Signed and Sealed this
Twenty-second Day of May, 2018

Andrei Iancu
*Director of the United States Patent and Trademark Office*

CERTIFICATE OF CORRECTION (continued)
U.S. Pat. No. 9,659,368 B2

Column 7, Line 40, "(9)" should be --(14)--.

Column 7, Line 50, "(10)" should be --(15)--.

Column 9, Line 49, "Eqs. (8) or (9)" should be --Eqs. (13) or (14)--.